Oct. 15, 1968 M. SEAL 3,405,510

APPARATUS FOR TRANSPORTING HYDROGEN

Filed March 17, 1967

INVENTOR.
MICHAEL SEAL
BY *Robert S. Honor*
ATTORNEY

United States Patent Office 3,405,510
Patented Oct. 15, 1968

3,405,510
APPARATUS FOR TRANSPORTING HYDROGEN
Michael Seal, Leonardo, N.J., assignor to Engelhard Industries, Inc., Newark, N.J., a corporation of Delaware
Filed Mar. 17, 1967, Ser. No. 623,861
8 Claims. (Cl. 55—208)

ABSTRACT OF THE DISCLOSURE

This disclosure relates to a means for purifying hydrogen by use of palladium and palladium alloys. These metals are used in transportation and purification of hydrogen by virtue of their ability to absorb and desorb the gas. The pure hydrogen gases are normally obtained from a mixture of gases containing hydrogen by contacting said mixture with the palladium or palladium alloy. Absorption then takes place followed by desorption of the hydrogen into a site different from the one in which the hydrogen was initially absorbed.

Background of the invention

This invention is directed to an apparatus for transporting hydrogen from one site to another. More particularly, it is concerned with the transportation of hydrogen from a location where it may be present in a gaseous mixture to a second location where it is present in relatively pure form. The invention also concerns an apparatus for purifying hydrogen.

Various methods for purifying hydrogen using palladium and palladium alloys are presently known. Some devices utilizing these methods use palladium or palladium alloy in the form of a foil or tube. In such devices, the foil or tube is located physically between the impure hydrogen and the pure product. A new device which has proved operable in purifying and transporting hydrogen comprises two separate and discreet chambers, one containing either hydrogen at low pressure or a mixture of hydrogen with other gas, and the other containing pure hydrogen at a pressure different from that present at the first location. The palladium or palladium alloy absorbs hydrogen at a first site and is then made to move to a separate site where the pure hydrogen is desorbed. This device is an improvement over those previously known in that it eliminates the costly requirement for high quality and integrity in the palladium or palladium alloy metal utilized. Since no wall of palladium physically separates the pure and impure or low pressure hydrogen, the palladium need not be flawless.

The new device above-described utilizes generally palladium in a continuous belt or wire to transport hydrogen from one chamber to another. The absorption and desorption chambers preferably have no wall with a common seal between such chambers and as a result at least four seals are used.

Summary of the invention

This invention pertains to apparatus for the transportation and purification of hydrogen by the use of palladium or palladium alloys. The apparatus of the present invention absorbs hydrogen by a continuous band of palladium-containing material which transports such hydrogen to a site where it will be desorbed and collected. It has an advantage over similar methods in that no hydrogen is lost from the system due to leakage through the seals and it requires the use of only two seals—with no hazard of hydrogen leakage to the atmosphere through such seals. The construction of seals which permit free passage of palladium, e.g. in the form of wires or belts, and a minimum passage of gases therethrough can be troublesome. It is an improvement on previously mentioned apparatus utilizing a continuous palladium material for transportation of hydrogen in that it uses a minimum number of seals.

Devices in accordance with the present invention comprise a first enclosure and a second enclosure, the second enclosure being adjacent to the first. In the first enclosure, hydrogen from a gaseous mixture or hydrogen at a low pressure is dissolved in a hydrogen-absorbing material. The material with dissolved hydrogen passes into the second enclosure where hydrogen is desorbed therefrom. The configurations of the present devices are such that both the first and second enclosures have walls with common seals. The devices of the present invention accordingly provide improved apparatus for hydrogen purification and transportation which utilizes only two seals. In such devices the pressure in the second enclosure is maintained higher than the pressure in the first enclosure.

It is an object of the present invention to provide a method for transporting hydrogen from one site to another. It is a further object of the invention to provide a means for purifying hydrogen. A still further object concerns provision of devices for purifying hydrogen which utilize a minimum number of seals. Still another object is provision of means for moving hydrogen from low pressure to a high pressure area. Further objects will be apparent from the following description of the invention.

Description of preferred embodiments

In accordance with the present invention, it has now been found that hydrogen may be transported or purified by the use of a device utilizing a hydrogen-absorbing material, such as palladium or palladium alloy, which absorbs and desorbs hydrogen at different sites (i.e. chambers or enclosures), said hydrogen-absorbing material not being a diffusion barrier between such sites. In the device of this invention, the desorption chamber lies adjacent the absorption chamber. The two enclosures are so disposed as to permit passage of the hydrogen-absorbing material from the first enclosure directly into the second enclosure and from the second enclosure directly into the first through seals common to each enclosure.

A gaseous mixture containing hydrogen is preferably fed into the first enclosure continuously. The hydrogen-absorbing material, which hereafter for convenience only will be called the alloy, is passed through this first enclosure at such speed as to allow the hydrogen to be adequately absorbed. The time necessary for adequate or complete absorption may be decreased by increasing the temperature of the alloy. This may be accomplished by the use of a furnace or other heating medium by which the temperature of the alloy may be raised for example to 100°–900° C. According to one aspect of this invention, this heating medium may be an electrical resistance heater.

This heater may be external to the alloy or the alloy may be heated internally by passing electric current through To determine suitable absorption temperatures, consideration must be given to the solubility and the rate of absorption of hydrogen in the hydrogen-absorbing material. Although the solubility of hydrogen decreases with increasing temperature, the rate of absorption increases. A compromise must be reached to effect sufficient absorption at a practical rate. Accordingly, a preferred temperature of the alloy in the absorption chamber is about 200°–500° C.

The alloy is transported from the first enclosure to the desorption chamber or second enclosure. This may be accomplished by driving a strip, wire belt or the like. The strip, wire, etc. need not be composed only of the alloy and may be made of an inert material, such as asbestos, and the like, having alloy thereon. For convenience, this type of configuration of the alloy will hereafter be called a wire, but is not intended that the subject matter of the invention be limited as result. A suitable driving device for the wire will include a simple motor which is preferably employed in such a manner as to permit variation in the wire speed.

The second site or enclosure according to this invention is the chamber in which hydrogen desorption takes place. The temperature of the wire at this location may again be about 100° to 900° C., but is preferably from about 300° C. to about 800° C.

As a practical matter, it is quite difficult to prevent all leakage at the seals separating the enclosures. When imperfect seals are utilized, it is desired according to this invention that the pressure of the desorption chamber be at least slightly greater than the pressure in the absorption chamber. During hydrogen purification this will essentially prevent leakage of the impure gas to the pure hydrogen. It will be noted that this invention embodies a "hydrogen pump" of relatively simple design by providing hydrogen at a pressure higher than the pressure at which it is absorbed. In order to provide a hydrogen pump, the temperature of the wire in the second enclosure should be higher than the wire temperature in the first enclosure.

The seals which are useful in preventing, or minimizing leakage from each location may be made from any suitable material. They may be either a liquid or a solid such as carbon or asbestos packing. To minimize energy requirements and simplify the design of equipment, it is preferred that the seals be operable without artificial cooling of the wire. However, the practical limitation of known seals may make it necessary, particularly when high absorption and desorption temperatures are used, to cool the wire before it passes through the seals. This may be accomplished by fluid cooling, for example with the incoming gas stream if this is relatively cool, or by contacting the wire with a suitable conductor of heat, e.g. a metal and providing a heat sink to which the heat may thus be conducted.

It is thus often desirable to assist in prolonging the life of solid seals used according to the present invention by cooling the wire before its passage through the seals. Some absorption of hydrogen takes place in the alloy during this cooling and, in the absorption chamber, this provides added proficiency to this invention. However, when the hydrogen pump embodiment is desired, this cooling should be as rapid as possible in the second enclosure to avoid significant reabsorption. When rapid cooling is effected, the rate at which the hydrogen will be reabsorbed will be so small that the wire will be passed out of the desorption chamber before substantial reabsorption has taken place.

*Brief description of the drawings*

Referring to the accompanying drawings, a preferred embodiment of the device of the present invention is shown in which.

Figure 1:
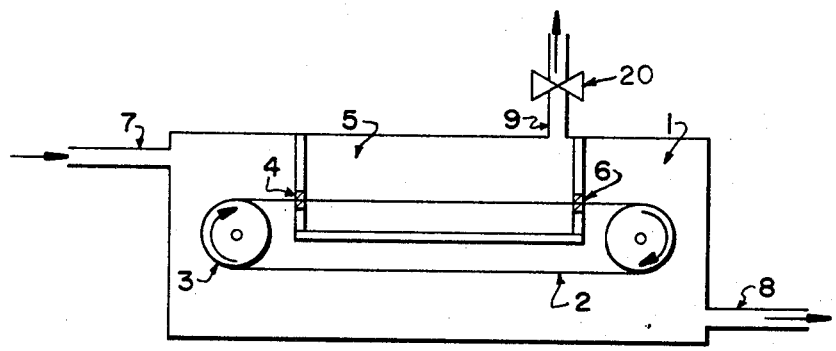
FIGURE 1 is a schematic view of apparatus useful in providing the desired hydrogen transportation or purification. There is shown an embodiment of the present invention in which the first enclosure 1 is the hydrogen absorption area. The alloy wire 2 passes through said enclosure around rollers and/or driving means 3, through seal 4 to the second enclosure 5 and through seal 6 back into the first enclosure.

The hydrogen is fed through entrance 7 at either low pressure or in admixture with other gas into enclosure 1 where pure hydrogen is absorbed in the wire 2. The wire 2 comprises palladium or a palladium alloy, said alloy being composed of palladium-silver, palladium-boron, palladium-gold or the like. A particularly suitable alloy contains, by weight, Pd–75% and Ag–25%. Hydrogen is desorbed in enclosure 5, generally because of a temperature differential between the wire in the first enclosure 1 and the wire in the second enclosure 5. Bleed gas is taken off at the exit 8. The pure hydrogen, generally at higher pressure than the entering hydrogen, is removed at exit 9 through valve 20, by which the pressure of the exit stream can be controlled.

Figure 2:
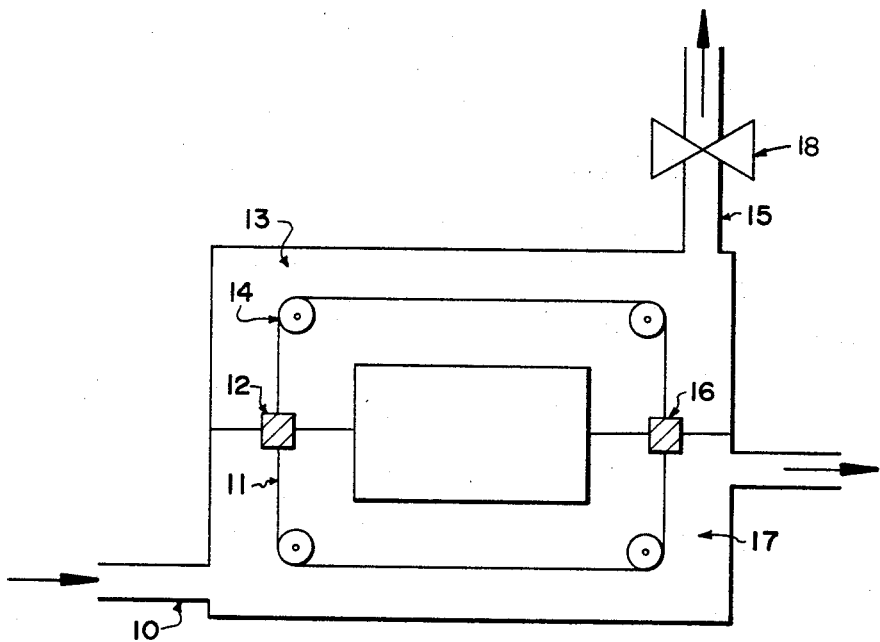

FIGURE 2 is a schematic view of an embodiment of this invention which has a configuration somewhat different from that in FIGURE 1 in that there is no chamber within the first chamber. The impure or low pressure hydrogen enters inlet 10. Pure hydrogen is absorbed by wire 11 and is transported on wire 11 through seal 12 into desorption chamber 13. The wire is then heated by some means, such as by use of a heating element in conjunction with roller 14, to cause emission of the pure hydrogen therefrom. The pure hydrogen exits at outlet 15 through valve 18, by which the pressure of the pure hydrogen exit stream can be controlled. The depleted alloy wire 11 then passes through seal 16 back into absorption chamber 17 for an additional cycle.

The term pure hydrogen means hydrogen containing minimal amounts of impurities, for instance, less than 0.1% of impurities and usually less than 0.01% of impurities.

It should be understood that although this invention has been described with reference to particular embodiments thereof, changes and modifications may be made which are within its intended scope, and it should be limited only by the language of the appended claims.

What is claimed is:

1. In apparatus for transporting pure hydrogen from a gas containing hydrogen comprising a first enclosure for retaining a gas containing hydrogen, a second enclosure, means for maintaining the second enclosure at a higher pressure than the first enclosure, a continuous band of hydrogen-absorbing material comprising palladium or palladium alloy within the first enclosure, means for transporting the hydrogen-absorbing material from within the first enclosure to within the second enclosure, means for heating the hydrogen-absorbing material within the second enclosure to cause desorption of pure hydrogen therefrom, means for supplying the gas containing hydrogen to the first enclosure, and means for withdrawing the pure hydrogen from the second enclosure, the improvement comprising having the second enclosure adjacent to the first and having at least one wall common to the first and second enclosures, and at least one seal through such wall, said seal also being common to the first and second enclosures, whereby a minimum number of seals is used in the apparatus and no hydrogen is lost by leakage through the seals to the atmosphere.

2. Apparatus according to claim 1 wherein the means for maintaining the second enclosure at a higher pressure than the first enclosure is a pressure valve located in the means for withdrawing pure hydrogen from the second enclosure.

3. Apparatus according to claim 1 wherein there is one wall common to the first and second enclosures and there are two seals through such wall, each seal being common to the first and second enclosures.

4. Apparatus according to claim 1 wherein there are two walls common to the first and second enclosures and each wall has one seal therethrough, each seal being common to the first and second enclosures.

5. Apparatus according to claim 1 in which the continuous band of hydrogen-absorbing material is in the form of a strip, a wire or belt, and the means for transporting the hydrogen-absorbing material acts by pulling said material from the first enclosure to the second enclosure.

6. Apparatus according to claim 5 in which the hydrogen-absorbing material is a wire of palladium alloy containing, by weight, about 75% palladium and about 25% silver.

7. Apparatus according to claim 1 in which the second enclosure is within the first enclosure.

8. Apparatus according to claim 7 in which the continuous band of hydrogen-absorbing material is in the form of a strip, wire or belt of a palladium alloy containing, by weight, about 75% palladium and about 25% silver.

References Cited

UNITED STATES PATENTS 2,302,807  11/1942  Shoeld _____ 55—34 X
2,773,561  12/1956  Hunter _____ 55—16

FOREIGN PATENTS 697,318  11/1964  Canada.

REUBEN FRIEDMAN, *Primary Examiner.*

C. N. HART, *Assistant Examiner.*